United States Patent
Josefsson et al.

(10) Patent No.: US 12,350,865 B2
(45) Date of Patent: Jul. 8, 2025

(54) METHOD AND ASSEMBLY FOR MANUFACTURING A BOARD ELEMENT COMPRISING A RECYCLED MATERIAL

(71) Applicant: Ceraloc Innovation AB, Viken (SE)

(72) Inventors: Per Josefsson, Ramlösa (SE); Christoffer Nilsson, Helsingborg (SE)

(73) Assignee: CERALOC INNOVATION AB, Viken (SE)

( * ) Notice: Subject to any disclaimer, the term of this patent is extended or adjusted under 35 U.S.C. 154(b) by 0 days.

(21) Appl. No.: 17/705,465

(22) Filed: Mar. 28, 2022

(65) Prior Publication Data

US 2022/0314503 A1     Oct. 6, 2022

(30) Foreign Application Priority Data

Mar. 30, 2021   (SE) .................................. 21503883

(51) Int. Cl.
*B29C 43/30*    (2006.01)
*B29B 17/00*    (2006.01)
(Continued)

(52) U.S. Cl.
CPC ............ *B29C 43/305* (2013.01); *B29B 17/00* (2013.01); *B29B 17/0042* (2013.01);
(Continued)

(58) Field of Classification Search
CPC . B29C 43/48; B29C 43/006; B29C 2043/483; B29B 17/0042
See application file for complete search history.

(56) References Cited

U.S. PATENT DOCUMENTS 3,797,702 A * 3/1974 Robertson ............. B29C 48/288
                                                        222/145.8
4,293,658 A * 10/1981 Raden ..................... C08J 9/0023
                                                        521/170
(Continued)

FOREIGN PATENT DOCUMENTS

CN          101134654 A        3/2008
CN          101852004 A       10/2010
(Continued)

OTHER PUBLICATIONS

Almasi et al., "Separate Collection and Recycling of PVC Flooring Installation Residue in Sweden", A system Assessment Deliverable in WP6, Project Constructivate, IVL Swedish Environmental Research Institute, (Nov. 2019), 40 pages.
(Continued)

*Primary Examiner* — Jeffrey M Wollschlager
(74) *Attorney, Agent, or Firm* — Boone IP Law

(57) ABSTRACT

A method for manufacturing a board element, such as a floor element, including an at least partially recycled board layer. The method includes providing a pre-processed material from at least one weight-reduced preformed board element, preferably being obtained by removal of material from a rear side thereof, wherein the pre-processed material includes a thermoplastic material, and providing a virgin material including a thermoplastic material. The method further includes applying heat and pressure to the pre-processed material and the virgin material in a double-belt press to form the board layer, and forming a board element comprising the board layer. Also, a corresponding assembly for manufacturing of a board element.

19 Claims, 6 Drawing Sheets

(51) Int. Cl.
  *B29C 43/48* (2006.01)
  *B29C 43/52* (2006.01)
  *B29C 43/56* (2006.01)
  *B29L 31/00* (2006.01)
(52) U.S. Cl.
  CPC .............. *B29C 43/48* (2013.01); *B29C 43/52* (2013.01); *B29C 43/56* (2013.01); *B29B 2017/0089* (2013.01); *B29C 2043/483* (2013.01); *B29C 2793/009* (2013.01); *B29L 2031/732* (2013.01)

(56) References Cited

U.S. PATENT DOCUMENTS

| | | | |
|---|---|---|---|
| 5,476,628 A * | 12/1995 | Baumgartl | C08J 11/06 264/37.32 |
| 6,093,359 A * | 7/2000 | Gauchel | B29B 15/105 264/109 |
| 7,514,026 B1 * | 4/2009 | Zafiroglu | D04H 1/54 264/913 |
| 8,245,477 B2 | 8/2012 | Pervan | |
| 8,381,488 B2 | 2/2013 | Pervan | |
| 8,720,151 B2 | 5/2014 | Pervan | |
| 8,850,769 B2 | 10/2014 | Pervan | |
| 8,875,464 B2 | 11/2014 | Pervan et al. | |
| 8,935,899 B2 | 1/2015 | Bergelin et al. | |
| 9,140,010 B2 | 9/2015 | Pervan | |
| 9,194,135 B2 | 11/2015 | Pervan | |
| 9,314,936 B2 | 4/2016 | Pervan | |
| 9,482,015 B2 | 11/2016 | Pervan | |
| 9,556,623 B2 | 1/2017 | Pervan | |
| 9,663,956 B2 | 5/2017 | Pervan | |
| 9,714,515 B2 | 7/2017 | Pervan | |
| 9,758,966 B2 | 9/2017 | Bergelin et al. | |
| 9,758,972 B2 | 9/2017 | Pervan | |
| 9,840,849 B2 | 12/2017 | Pervan | |
| 10,066,400 B2 | 9/2018 | Pervan | |
| 10,619,356 B2 | 4/2020 | Pervan | |
| 10,669,724 B2 | 6/2020 | Pervan | |
| 11,002,022 B2 | 5/2021 | Pervan | |
| 2002/0164492 A1 * | 11/2002 | Nebgen | C08L 23/10 428/476.1 |
| 2003/0087973 A1 * | 5/2003 | Muzzy | B32B 5/28 523/222 |
| 2003/0233809 A1 | 12/2003 | Pervan | |
| 2004/0178532 A1 * | 9/2004 | Jolitz | B29C 48/001 53/399 |
| 2005/0208255 A1 | 9/2005 | Pervan | |
| 2008/0008871 A1 | 1/2008 | Pervan | |
| 2008/0311355 A1 | 12/2008 | Chen | |
| 2011/0278754 A1 * | 11/2011 | Lehtinen | B29B 7/283 264/40.7 |
| 2013/0047536 A1 * | 2/2013 | Pervan | E04F 15/18 52/309.1 |
| 2013/0145707 A1 | 6/2013 | Pervan | |
| 2013/0199120 A1 | 8/2013 | Bergelin et al. | |
| 2013/0253100 A1 * | 9/2013 | Bailey | C08K 3/26 524/427 |
| 2013/0283720 A1 | 10/2013 | Pervan et al. | |
| 2014/0000197 A1 | 1/2014 | Pervan | |
| 2014/0037974 A1 * | 2/2014 | Kondo | B32B 27/08 428/500 |
| 2014/0215952 A1 | 8/2014 | Pervan | |
| 2014/0295195 A1 | 10/2014 | Tian et al. | |
| 2015/0059927 A1 | 3/2015 | Brännström et al. | |
| 2015/0090400 A1 | 4/2015 | Bergelin et al. | |
| 2015/0114552 A1 * | 4/2015 | Cernohous | C08K 3/36 264/483 |
| 2015/0121793 A1 * | 5/2015 | Segaert | B32B 5/024 52/506.01 |
| 2015/0345153 A1 | 12/2015 | Pervan | |
| 2016/0017113 A1 * | 1/2016 | Müller | C08K 3/26 524/425 |
| 2016/0136913 A1 * | 5/2016 | Hannig | B44C 5/0461 425/105 |
| 2016/0194883 A1 | 7/2016 | Pervan | |
| 2016/0208501 A1 | 7/2016 | Pervan | |
| 2016/0265234 A1 | 9/2016 | Pervan | |
| 2016/0265236 A1 | 9/2016 | Pervan | |
| 2016/0273231 A1 * | 9/2016 | Jiang | E04F 15/105 |
| 2017/0114550 A1 | 4/2017 | Pervan | |
| 2017/0144354 A1 | 5/2017 | Lombaert et al. | |
| 2017/0157977 A1 * | 6/2017 | Hannig | B29C 43/48 |
| 2017/0268238 A1 | 9/2017 | Pervan | |
| 2018/0080232 A1 | 3/2018 | Pervan | |
| 2018/0313094 A1 | 11/2018 | Pervan | |
| 2019/0091911 A1 * | 3/2019 | Wu | B29C 48/305 |
| 2019/0367716 A1 * | 12/2019 | Hannig | B32B 27/08 |
| 2020/0016799 A1 * | 1/2020 | Van Vlassenrode | E04F 15/02038 |
| 2020/0208411 A1 | 7/2020 | Pervan | |
| 2020/0282589 A1 | 9/2020 | Joseffson et al. | |
| 2020/0308846 A1 | 10/2020 | Joseffson et al. | |
| 2021/0032877 A1 | 2/2021 | Pervan | |
| 2021/0122148 A1 * | 4/2021 | VanSumeren | B29C 48/07 |
| 2021/0198901 A1 | 7/2021 | Josefsson et al. | |
| 2021/0245400 A1 * | 8/2021 | Moore | B07C 5/342 |
| 2021/0363760 A1 | 11/2021 | Pervan | |
| 2022/0063167 A1 | 3/2022 | Joseffson et al. | |

FOREIGN PATENT DOCUMENTS

| | | |
|---|---|---|
| CN | 102555150 A | 7/2012 |
| CN | 103146094 A | 6/2013 |
| CN | 104592687 A | 5/2015 |
| CN | 107880366 A | 4/2018 |
| CN | 108560850 A | 9/2018 |
| EP | 3351703 A1 | 7/2018 |
| EP | 2877649 B1 | 3/2019 |
| EP | 3126145 B1 | 8/2020 |
| GB | 2 162 117 A | 1/1986 |
| JP | 2004-114663 A | 4/2004 |
| KR | 2013-0032216 A | 4/2013 |
| WO | 2004/012918 A1 | 2/2004 |
| WO | 2010/072357 A2 | 7/2010 |
| WO | WO 2013/032391 A1 | 3/2013 |
| WO | WO 2014/007738 A1 | 1/2014 |
| WO | 2015/028390 A1 | 3/2015 |
| WO | 2019/083895 A1 | 5/2019 |
| WO | WO 2020/180237 A1 | 9/2020 |
| WO | WO 2021/018918 A1 | 2/2021 |

OTHER PUBLICATIONS

Notification of Transmittal of the International Search Report (Forms PCT/ISA/220 and PCT/ISA/210) and the Written Opinion of the International Searching Authority (Form PCT/ISA/237) issued Apr. 29, 2022, by the Patent-och registreringsverket in corresponding International Application No. PCT/SE2022/050296. (12 pages).
U.S. Appl. No. 17/812,281, Darko Pervan, filed Jul. 13, 2022.
U.S. Appl. No. 17/831,826, Per Josefsson, filed Jun. 3, 2022.
U.S. Appl. No. 18/055,473, Per Josefsson, filed Nov. 15, 2022.
U.S. Appl. No. 18/209,359, Per Josefsson, filed Jun. 13, 2023.
U.S. Appl. No. 18/209,667, Per Josefsson, filed Jun. 14, 2023.
U.S. Appl. No. 18/210,429, Per Josefsson, filed Jun. 15, 2023.
U.S. Appl. No. 18/240,192, Darko Pervan, filed Aug. 30, 2023.
U.S. Appl. No. 18/295,559, Darko Pervan, filed Apr. 4, 2023.
U.S. Appl. No. 18/425,012, Per Josefsson, filed Jan. 29, 2024.
U.S. Appl. No. 18/495,918, Per Josefsson, filed Oct. 27, 2023.
U.S. Appl. No. 18/628,988, Per Josefsson, filed Apr. 8, 2024.
U.S. Appl. No. 18/946,258, Per Josefsson, filed Nov. 13, 2024.
U.S. Appl. No. 18/663,063, Per Josefsson, filed May 14, 2024.
Supplementary European Search Report issued by the European Patent Office in EP Application No. 22781751.7 on Jan. 28, 2025 (9 pages).
U.S. Appl. No. 18/991,969, Darko Pervan, filed Dec. 23, 2024.
Official Action with Search Report issued in Swedish Patent Application No. 2150388-3, Nov. 24, 2021, PRV Swedish Patents and Registration Office, Stockholm, SE, 7 pages.

(56) References Cited

OTHER PUBLICATIONS

Josefsson, Per, et al., U.S. Appl. No. 17/831,826 entitled "Mineral-Based Panel Comprising Grooves and a Method for Forming Grooves," filed Jun. 3, 2022.

* cited by examiner

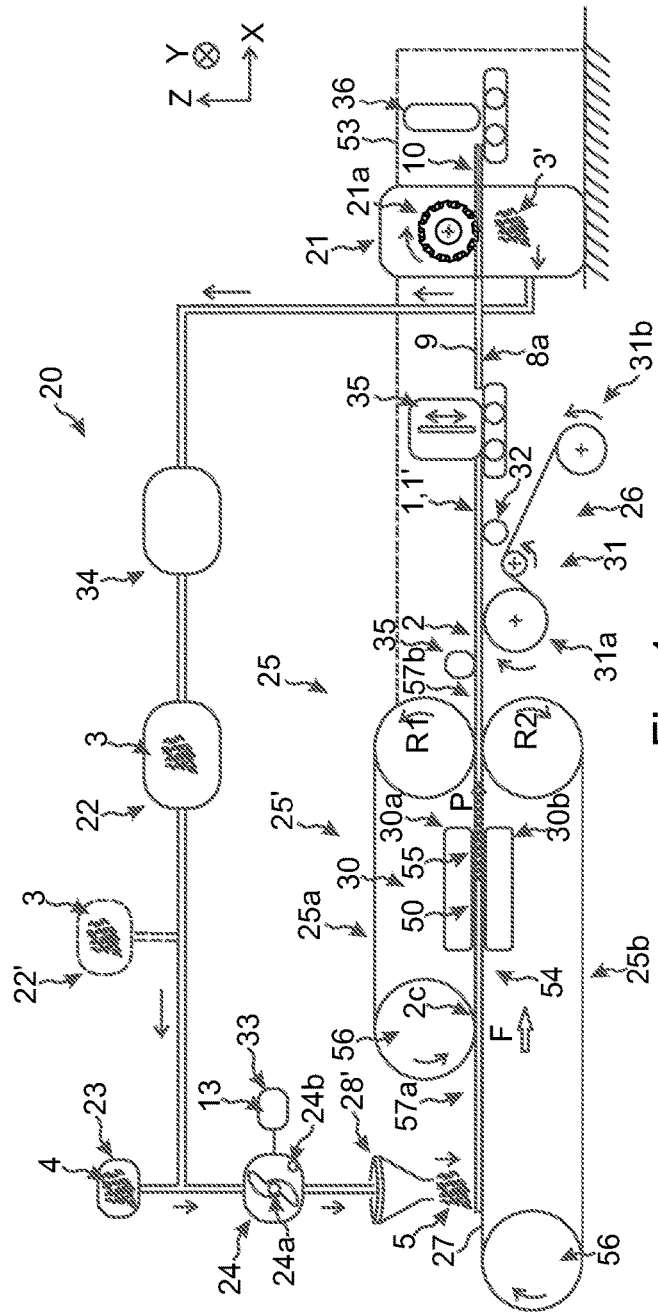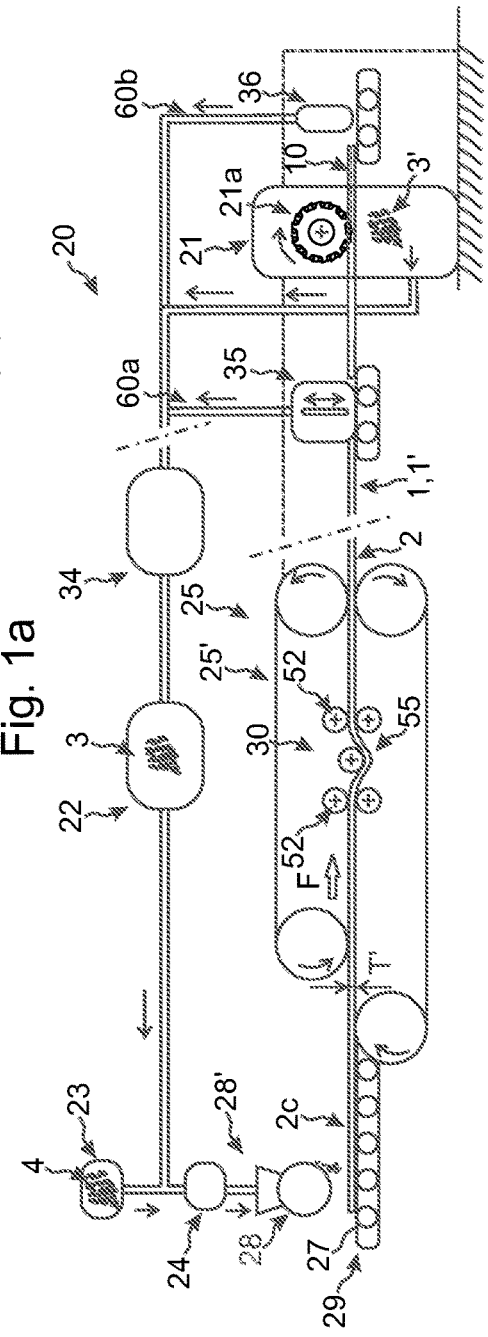
Fig. 1a
Fig. 1b

METHOD AND ASSEMBLY FOR MANUFACTURING A BOARD ELEMENT COMPRISING A RECYCLED MATERIAL

CROSS REFERENCE TO RELATED APPLICATIONS

The present application claims the benefit of Swedish Application No. 2150388-3, filed on Mar. 30, 2021. The entire contents of Swedish Application No. 2150388-3 are hereby incorporated herein by reference in their entirety.

TECHNICAL FIELD

The disclosure generally relates to a board element, such as a floor element, comprising an at least partially recycled board layer. In particular, material removed from a rear side of a preformed board element may be recycled. More specifically, the disclosure relates to a method and an assembly for manufacturing such a board element.

BACKGROUND

WO 2013/032391 and WO 2014/007738 disclose panels, such as floor panels, comprising a thermoplastic material and being provided with a certain groove structure in their rear sides for decreasing their weight.

An advantage of thermoplastic-based panels is that at least part of the panels may be recycled. In known recycling processes, however, materials from various more or less known sources are typically blended. Therefore, it may be hard to know the precise amount and ratios of the various materials in the recycled panels, which may compromise the quality of the panels.

In fact, it is known, e.g., from WO 2013/032391, that the cut-off material obtained from forming flexing grooves in a rear side of a core may be recycled completely and may be used to produce a new core. However, due to the substantial degree of cut-off material in this type of panels there is a need to considerably improve the recycling process. Additionally, there is a desire to improve at least some aspects of the known manufacturing methods, such as their efficiency.

SUMMARY

It is therefore an object of at least embodiments of the present disclosure to provide a reduced processing time of a method for manufacturing a board element, thereby increasing the capacity of the manufacturing.

Another object of at least embodiments of the present disclosure is to provide a method for manufacturing a board element, which is more energy efficient.

Yet another object of at least embodiments of the present disclosure is to provide such a method while improving at least one mechanical property of the board element.

These and other objects and advantages that will be apparent from the description have been achieved by the various aspects, embodiments and examples described below.

In accordance with a first aspect of the disclosure, there is provided a method for manufacturing a board element, such as a floor element, comprising an at least partially recycled board layer. The method comprises providing a pre-processed material from at least one, optionally weight-reduced, preformed board element, which preferably is obtained by removal of material from a rear side thereof, wherein the pre-processed material comprises a thermoplastic material and, preferably, a filler. The method further comprises providing a virgin material comprising a thermoplastic material and, preferably, a filler, applying heat and pressure to the pre-processed material and the virgin material in a press, preferably a double-belt press, to form the board layer, and, optionally, forming a board element comprising the board layer.

Hence, the board layer, and consequently the board element, may be at least partially composed of a pre-processed material. Generally, the pre-processed material, sometimes also referred to as a regrind material, may be a recycled material, preferably from internal pre-consumption waste. The pre-processed material may previously have been processed at least one time, preferably under heat and pressure, during manufacturing of the preformed board element, e.g., from a virgin material and/or a previously pre-processed material. The processing under heat and pressure may include forming of at least one layer of the board element in a press, such as a double-belt press, at least one static press or an extruder (being an example of a press throughout the present disclosure).

By means of the press, such as a double-belt press, the board layer, and optionally the board element, may be manufactured continuously, e.g., in a single pass operation.

Generally, heat and mechanical energy may be needed to gel and/or fuse the thermoplastic materials, for example comprising polyvinyl chloride, PVC. In accordance with the first aspect, the board layer is formed from a pre-processed material and a virgin material, preferably in a continuous pressing operation. As a consequence, less energy and/or a reduced temperature may be needed for fusing the materials of the board layer under heat and pressure. For example, a gelation time and/or a fusion energy may be reduced. Moreover, the energy applied from a double-belt press, preferably operating at a speed of 3-50 m/min, may be sufficient. Indeed, the heat and/or energy transfer from the double-belt press to the pre-processed and virgin materials may be relatively low, even for forming a high-quality board layer. In view of the above, a reduced processing time and thereby an increased capacity may be provided.

Another advantage in view of the above is that the mechanical properties of the board element, such as its flexural properties, for example modulus of elasticity (or Young's modulus E), flexural modulus, bending strength, flexural strain at break, etc., may be improved. The flexural properties preferably are determined according to ISO 178.

It is noted that in contrast to recycling of waste material in known processes, such as recycling of material from the cutting of planks, the board elements comprising a rear side with removed material are designed to have a reduced weight, thereby creating a substantial amount of waste material.

The virgin material, or equivalently raw material, may be a material that has never been processed under heat and pressure, such as in a manufacturing process, e.g., a board production. The virgin material may be material directly provided from a supplier. It is clear to a skilled person in the art, however, that the virgin material may be compounded per se, e.g., under heat and/or pressure. Examples include when the virgin material is formed into a powder, pellets, a particulate or a granulate, and/or when various additives are added to it. Hence, the virgin material and the pre-processed materials may be clearly distinguished.

Any thermoplastic material described herein may be a thermoplastic composite material comprising a thermoplastic polymer and additional additives, such as at least one selected from the group consisting of a filler, a stabilizer, a blowing agent, a plasticizer, a colourant, a foaming agent, a lubricant, an impact modifier, a processing aid, etc.

The press may be a double-belt press.

The double-belt press may operate at a pressure of 0.1-7.0 MPa and/or at a temperature of 70-260° C., such as 90-200° C., preferably in the step of applying heat and pressure to the pre-processed material and the virgin material.

The press, such as the double-belt press, may apply pressure to the pre-processed and virgin materials in an isobaric and/or an isochoric process. The isobaric pressing operation may provide a substantially constant pressure during the pressing operation, e.g., even if a thickness of the materials to be pressed, for example being provided as a sheet-shaped layer, varies somewhat. Thereby, a more uniform pressure distribution may be provided, such as over the entire board layer. Also, the materials may gradually be densified. The isochoric pressing operation may provide pressure while maintaining a substantially constant volume during the pressing operation. Thereby, a board layer having a constant thickness may be provided. For example, a fixed press gap may be maintained at a fixed distance during the pressing operation. The pressure may vary during the isochoric pressing operation.

The method may further comprise precompressing the pre-processed and virgin materials. As a consequence, the materials may be formed into a sheet-shaped layer. For example, a width of the sheet-shaped layer may be up to 300 cm. In addition, the heat conductivity of the materials to be pressed may be increased. This may reduce a level of discoloration of the thermoplastic material therein, such as PVC, after pressing under heat.

The pre-processed material and the virgin material may comprise substantially the same material composition. Thereby, a board element comprising at least one layer having a predetermined material composition, such as a similar material composition as the preformed board element(s), may be more easily manufactured.

By comprising substantially the same material compositions, the pre-processed and the virgin materials may comprise substantially the same types and/or amounts of additives included therein. In particular, the types and/or amounts of thermoplastic polymers, such as PVC and, preferably, the types and/or amounts of fillers, may be substantially the same. Optionally, the types and/or amounts of additives therein, other than fillers, may be the same.

The pre-processed material may be provided by removal of material from a rear side and from a single layer of the preformed board element(s). Thereby, a well-defined material composition may be provided. For example, the material composition of the single layer in the preformed board element(s) may be known previously. Alternatively, the pre-processed material may be provided by removal of material from a rear side and from at least two layers of the preformed board element(s). The material composition of the pre-processed material may be determined from previously known material compositions of the at least two layers, e.g., by knowing their amounts of thermoplastic material and, preferably, fillers. The amounts of virgin and pre-processed materials may be adapted accordingly for providing a predetermined ratio therebetween (e.g., in wt %). An advantage of any of these embodiments is that the amounts and/or ratios may be known beforehand or may easily be determined.

The method may further comprise forming grooves by removing material from the rear side of the preformed board element(s) to provide the pre-processed material. Thereby, the pre-processed thermoplastic material may be provided as production waste.

The material may be removed by a processing device, such as a rotating cutting device. It is understood to the person skilled in the art, however, that other processing devices, such as a carving tool, a scraping tool, a drilling tool or a milling tool, are equally conceivable. Such tools and resulting grooves are described in WO 2020/180237 on page 25, lines 16-23, page 55, line 30 to page 56, line 33, page 57, lines 7-25 and in FIGS. 17$a$-17$e$ and 18$a$-18$e$, which parts hereby are explicitly incorporated by reference.

Generally, at least 5 wt % of pre-processed material may be provided. More than 10 wt %, preferably more than 20 wt %, even more preferably more than 40 wt %, of pre-processed material may be provided. The wt % may be specified as a percentage of a total weight of the material provided for forming the board layer, such as the total weight of the pre-processed and virgin materials, e.g., provided as a mixture (defined below). Additionally, or alternatively, the formed board layer may comprise more than 10 wt %, preferably more than 20 wt %, even more preferably more than 40 wt %, of pre-processed material. The wt % may be specified as a percentage of a total weight of the material of the board layer. It has been found that in all these scenarios, but especially when more than 40 wt % is used, at least some mechanical properties of the board layer may become significantly improved.

The pre-processed material and/or the virgin material may comprise PVC. It is clear that in some embodiments, the pre-processed and/or virgin material(s) may comprise other materials, such as polypropylene (PP) or polyethylene (PE).

The filler in any embodiment herein may be an inorganic filler, such as a mineral material, for example calcium carbonate ($CaCO_3$), talc or stone material, such as stone powder. Alternatively, or additionally, the filler may be an organic filler. For example, the filler may comprise fibres, such as wood fibres, or bamboo.

A degree of filler may exceed 40 wt %, preferably exceeding 60 wt %, and/or a degree of plasticizer may be less than 5 wt % in any or both of the pre-processed and the virgin materials. Thereby, the board layer may become rigid. Generally, a rigid board layer may be harder to fuse under heat and pressure. The method in accordance with the first aspect, which may require less energy and/or a reduced temperature for fusing the materials, may therefore be particularly suitable for board elements comprising such a rigid board layer. In addition, improved mechanical properties may be provided by said method, which may be particularly desirable for a rigid board layer, which may be especially prone to being damaged, such as by cracking.

Alternatively, or additionally, the rigid board layer may have a modulus of elasticity, or Young's modulus E, of 1-10 GPa, such as 3-7 GPa.

The method may further comprise mixing the pre-processed material and the virgin material to provide a mixture and applying heat and pressure to the mixture in the press, such as a double-belt press. Thereby, a more homogeneous board layer may be provided. Moreover, by means of the mixing, a homogeneous blend of the pre-processed and virgin materials may be provided. For example, the materials may be mixed in a mixer or by means of scattering devices.

In some embodiments, the pre-processed thermoplastic material, preferably the removed material from the rear side, may be continuously fed back to an application device configured to apply the materials on a receiving member, optionally via a mixer and/or a preparation device.

Generally, the method may further comprise applying the pre-processed and the virgin material, such as the mixture, on a receiving member.

The method may further comprise scattering the mixture on a receiving member.

The mixing may further comprise mixing a stabilizer with the pre-processed and virgin materials. Indeed, the pre-processed material, in particular the thermoplastic material therein, may have been degraded during the previous processing under heat and pressure, such as during formation of the preformed board element, and a degree of stabilizer therein may have been decreased. In non-restrictive examples, a degree of added stabilizer may be 0.5-6 wt %, such as 1-5 wt % or 2-4 wt %.

The method may further comprise preparing the pre-processed material before the applying of heat and pressure in the press, such as the double-belt press, and/or before the mixing, such as by cutting and/or separation.

The mixing may comprise hot-cold mixing the pre-processed and virgin materials. Thereby, a more homogeneous mixture may be provided. In addition, an amount of water, such as water vapour, may be reduced in the mixture.

The method may further comprise preheating the pre-processed and virgin materials, such as during mixing and/or during precompression, such as at a temperature of 80-200° C., such as 100-150° C. Thereby, an amount of water, such as water vapour, may be reduced in the mixture. Also, the melting and/or fusing and/or homogenization of the materials may be improved. In addition, a mixing and/or migration of at least some of the additional additives into the thermoplastic material may be improved.

The method may further comprise applying the pre-processed and virgin materials on a carrier. The carrier may be adapted to be part of the board element to be manufactured. A substrate comprising a board layer provided on the carrier may be formed by laminating the pre-processed and virgin materials to the carrier under heat and pressure.

The carrier may be a core, preferably comprising a thermoplastic material and a filler. The carrier may be a mat, such as a glass-fibre mat or a fabric mat, or a paper.

In some embodiments the carrier may be a backing layer, preferably having a thickness of less than 2 mm. The backing layer may be adapted to balance a board element comprising the backing layer and the carrier.

In some embodiments, the carrier may be a wear layer, optionally provided with a décor layer, such as a print layer. Preferably the wear layer and/or décor layer has a thickness of less than 0.7 mm. In some embodiments, the carrier may be a décor layer, such as a print layer.

The forming of a board element may include laminating an upper and/or a lower layer arrangement to the board layer, preferably under heat and/or pressure. The upper and/or lower layer arrangement may comprise at least one upper and/or lower layer.

The method may further comprise post-processing the board element and/or the preformed board element, for example by dividing any or both board elements into at least one panel and, optionally, forming a, preferably mechanical, locking device in the panel(s).

Throughout the present disclosure the dividing may optionally include trimming of the board element, such as along its edge portions. Material from the dividing process and/or the forming of a locking device may be provided as additional pre-processed material for forming the at least partially recycled board layer.

In some embodiments, the panel(s) may not be provided with any mechanical locking device. For example, each panel may be embodied as a floor panel configured to be installed loosely on a subfloor or it may be embodied as a floor panel configured to be nailed or glued to the subfloor.

In accordance with a second aspect of the disclosure, there is provided a method for manufacturing a board element, such as a floor element, comprising a completely recycled board layer. The method comprises providing a pre-processed material from at least one, optionally weight-reduced, preformed board element, which preferably is obtained by removal of material from a rear side thereof, wherein the pre-processed material comprises a thermoplastic material and, preferably, a filler. The method further applying heat and pressure to the pre-processed material in a press, such as a double-belt press, to form the board layer, and, optionally, forming a board element comprising the board layer. Embodiments and examples of the second aspect are largely analogous to embodiments and examples of the first aspect, whereby reference is made thereto.

In accordance with a third aspect of the disclosure, there is provided an assembly for manufacturing of a board element, such as a floor element, comprising an at least partially recycled board layer. The assembly comprises a processing device configured to remove material from a preformed board element, preferably from a rear side thereof. The assembly further comprises a receptacle configured to receive material removed by the processing device, a container for containing a virgin material, and optionally a mixer communicating with the receptacle and the container and/or an application device, such as a scattering device configured to apply, such as scatter, the removed material and the virgin material, e.g., provided as a mixture, on a receiving member of the assembly. The assembly further comprises a press, such as a double-belt press, configured to apply heat and pressure to form the board layer and, optionally, a lamination device configured to laminate an upper and/or a lower layer arrangement to the board layer.

Embodiments and examples of the third aspect are largely analogous to embodiments and examples of the first and second aspects, whereby reference is made thereto.

In accordance with a fourth aspect of the disclosure, there is provided a method for manufacturing a board element, such as a floor element, comprising an at least partially recycled board layer in complete analogy with the first or second aspect, but where the pre-processed material is generally provided from production waste, such as internal pre-consumption waste, instead from at least one weight-reduced preformed board element.

Embodiments and examples of the fourth aspect are largely analogous to embodiments and examples of the first or second aspect, whereby reference is made thereto. In addition the following embodiments are conceivable.

The internal pre-consumption waste may be provided from a forming of a preformed board element, such as from a dividing process and/or from a formation of a locking device and/or from removal of material from a rear side thereof and/or from rejected material, e.g., due to defective board elements, etc.

In accordance with a fifth aspect of the disclosure, there is provided a board layer, wherein an amount of pre-processed material is larger than an amount of virgin material in an outer portion of the board layer. In accordance with a sixth aspect of the disclosure, there is provided a board layer, wherein an amount of virgin material is larger than an amount of pre-processed material in an outer portion of the board layer. In particular, the board layer in accordance with any of the first, third or fourth aspects may be embodied in accord with the fifth or the sixth aspect.

Aspects of the disclosure has mainly been described above with reference to a few embodiments. However, as is readily appreciated by a person skilled in the art, other embodiments than the ones disclosed above are equally possible within the scope of aspects of the disclosure.

Additionally, it is emphasized that the press in the first, second, third and fourth aspects may in any embodiment herein be or comprise an extruder or at least one static press.

Generally, all terms used herein, such as in the claims and in the items in the embodiment section below, are to be interpreted according to their ordinary meaning in the technical field, unless explicitly defined otherwise. All references to "a/an/the [element, device, component, means, step, etc.]" are to be interpreted openly as referring to at least one instance of said element, device, component, means, step, etc., unless explicitly stated otherwise. Reference to one or a plurality of "at least one element", etc., may shortly be referred to as "the element(s)".

BRIEF DESCRIPTION OF THE DRAWINGS

The disclosure will in the following be described in connection to exemplary embodiments and in greater detail with reference to the appended exemplary drawings, wherein:

FIGS. 1a-1b illustrate in side views embodiments of an assembly for manufacturing of a board element.

DETAILED DESCRIPTION

Figure 2A:
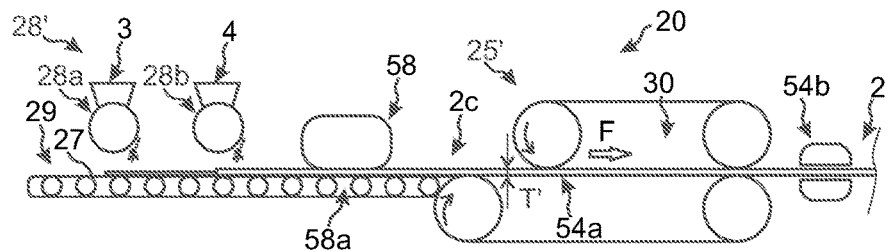
FIGS. 2a-2f illustrate in side views (FIGS. 2a-2c) embodiments of an assembly for manufacturing a board element and in top views (FIGS. 2d-2f) embodiments of isobaric and/or isochoric modules and heating and/or cooling units of the assembly in, e.g., FIGS. 1a-1b and 2a-2c.
Figure 2B:
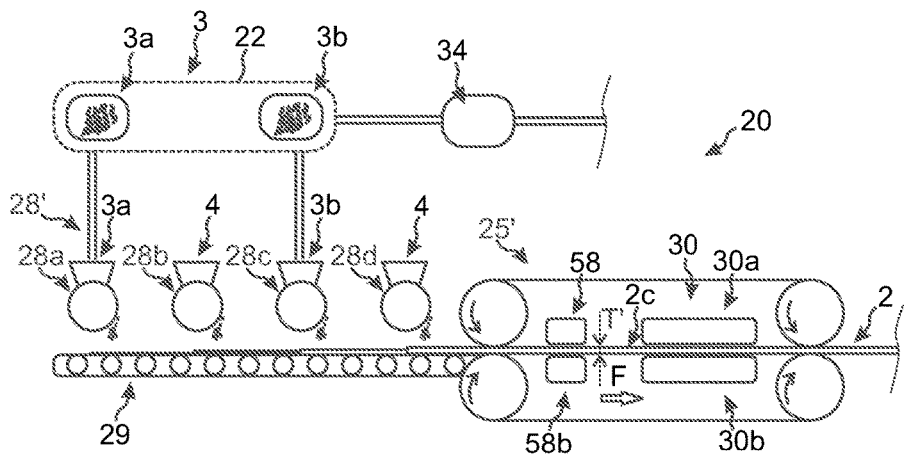

Next, various embodiments of a method and of an assembly 20 for manufacturing of a board element 1, such as a floor element, comprising an at least partially recycled board layer 2 will be described with reference to the embodiments in, e.g., FIGS. 1a-1b, 2a-2f, 3, 4a-4e, 5a-5i and, 6a-6b.

FIGS. 1a-1b and 2a-2c illustrate embodiments of the assembly 20. The assembly 20 may comprise a processing device 21 configured to remove material from at least one preformed board element 1' or preformed panel 10' for reducing its weight. As shown in FIGS. 1a-1b, the processing device 21 may be configured to remove material 3', such as chips, from a rear side 9 of the preformed board element 1', preferably by formation of grooves 11 therein, cf., FIGS. 4a-4e and 5h-5i. Preferably, the preformed board element 1', and hence the removed material 3', comprises a thermoplastic material, such as PVC, PP or PE, and a filler, such as a mineral material. For example, the processing device 21 may comprise a rotating cutting device 21a. The removed material 3' may thereby provide a pre-processed material 3 or, equivalently, a regrind. It is understood that FIGS. 1a-1b, in which the pre-processed material may be directly recycled, are schematic and that in some embodiments the act of removing material from the preformed board element(s) 1' may be performed at a different location, e.g., within the same manufacturing plant, and that the removed material 3' may be temporarily stored before using it to manufacture new board elements 1. The processing device 21 may be connected to a frame member 53 provided on a supporting structure, such as a support floor, which preferably is planar. The frame member may extend along horizontal directions X and Y and a vertical direction Z. In operation, the horizontal direction X may be parallel with a feeding direction F of the assembly 20.

By means of the removal of material, the preformed board element 1' may reduce its weight by at least 10%, such as at least 15%. A groove depth GD may be at least 20%, such as at least 30%, of a thickness T of the preformed board element 1' or preformed panel 10' and/or of a single layer 7 thereof, cf., FIG. 4c.

The assembly 20 comprises a receptacle 22 configured to receive material 3' removed by the processing device 21 and a container 23 for containing a virgin material 4 comprising a thermoplastic material, such as PVC, PP or PE. Moreover, the assembly 20 comprises a press 25 in the form of a double-belt press 25' configured to apply heat and pressure to the pre-processed material 3 and the virgin material 4 to form the board layer 2. Thereby, the board element 1 comprising the board layer 2 may be formed. The double-belt press 25' may provide continuous manufacturing of the board layer 2 and/or the board element 1.

In some embodiments, and as illustrated in, e.g., FIGS. 1a-1b, the assembly 20 comprises a mixer 24 communicating with the receptacle 22 and the container 23. For example, the mixer 24 may comprise a rotatable mixing member 24a, e.g., comprising at least one rotor. Thereby, heat may be generated by friction. Optionally, the heat may be controlled, e.g., by a heating mantle. Yet optionally, the mixer 24 may comprise a preheater 24b for preheating and/or melting the materials 3, 4. The mixer 24 may be configured to mix the pre-processed 3 and the virgin 4 material to provide a mixture 5. For example, the mixture 5 may be provided as a, preferably dry, blend of materials. Optionally, a stabilizer 13 is mixed with the pre-processed 3 and virgin 4 materials, which thereby may be provided in the mixture 5. The stabilizer 13 may be contained in a stabilizer reservoir 33 in communication with the mixer 24.

Preferably, the mixer 24 is a hot-cold mixer, but other mixers are equally conceivable, such as scattering devices 28a, 28b (see below for details) or a high-speed blending machine.

The pre-processed 3 and virgin 4 materials, such as the mixture 5 provided from the mixer 24, may be applied on a receiving member 27 of the assembly 20. As shown in FIG. 1a, the, preferably displaceably arranged, receiving member 27 may be provided as a portion of the double-belt press 25'. Alternatively, as illustrated in FIGS. 1b and 2a-2c, it may be provided as a portion of a, preferably separately arranged, transportation device 29, such as a conveyor belt. The materials 3, 4, such as the mixture 5, may be transported from the receiving member 27 to a pressing member 30 of the double-belt press. The pressing member 30 may comprise an upper 30*a* and/or a lower 30*b* press member configured to apply pressure, and preferably heat, on the materials 3, 4, such as on the mixture 5, for forming the board layer 2. Generally herein, the pressure, and preferably heat, may be applied in a pressing zone 55 where the pressing member 30 may be provided.

As shown in FIGS. 1*a*-1*b* and 2*a*-2*c*, the assembly 20 may comprise an application device 28', such as a scattering device 28, configured to apply the materials 3, 4 and/or the mixture 5 on the receiving member 27, such as by scattering or strewing. In some embodiments, as shown in, e.g., FIGS. 2*a*-2*b*, the pre-processed 3 and the virgin 4 materials may be scattered separately on the receiving member 27 by a respective scattering device 28*a*, 28*b*, thereby mixing the materials 3, 4 for providing the mixture 5. Optionally, there may be at least two respective scattering devices 28*a*, 28*b*, 28*c*, 28*d* for providing the mixing of the pre-processed 3 and the virgin 4 materials, cf., FIG. 2*b*.

Generally herein, the pre-processed material 3 may be provided as a granulate, a powder, a particulate, chips, or shavings. Moreover, the virgin material 4 preferably is provided as pellets, a granulate, a powder, or a particulate. In non-limiting examples, a size of the removed material 3' and/or the pre-processed material 3, such as of elements therein, may be 0.05-50 mm, such as 0.05-25 mm or 0.05-5 mm, at least in one direction, such as in two or three perpendicular directions. Preferably, the size is a maximum size of the elements.

Moreover, the pre-processed material 3 preferably is prepared before it is applied on the receiving member 27, such as by cutting and/or separation. The preparation may be performed in a preparation device 34 before the mixing, cf., FIGS. 1*a*-1*b*. The preparation may also comprise drying of the pre-processed material in a drier, e.g., for reducing the formation of gas bubbles. Optionally, the pre-processed material may be stored in the receptacle 22 before preparing and/or before mixing it with the virgin material 4. In non-limiting examples, a size of the virgin material, such as of elements therein, may be less than 0.5 mm, such as less than 0.3 mm, preferably specified in terms of an average size, such as a D98 particle size.

For example, the pre-processed material 3 may be cut into preferred sizes, such as in a cutter, shredder or grinder. Smaller sizes may provide a more homogeneous board layer 2. In non-limiting examples, a size of the cut pre-processed material 3 may be 0.05-5 mm, such as 0.05-2 mm. Alternatively, or additionally, the pre-processed material 3 may be separated into material groups 3*a*, 3*b* having preferred characteristics, such as by sieving or cyclonic separation, cf., FIG. 2*b*. The characteristics may be at least one selected from the group of material compositions, sizes, weights, shapes, and densities of the pre-processed material. In some embodiments, sizes below a certain value, e.g., in the form of fines, may be discarded from the pre-processed material, e.g., since very small elements and larger elements may behave very differently under melting and/or fusing.

Figure 4A:
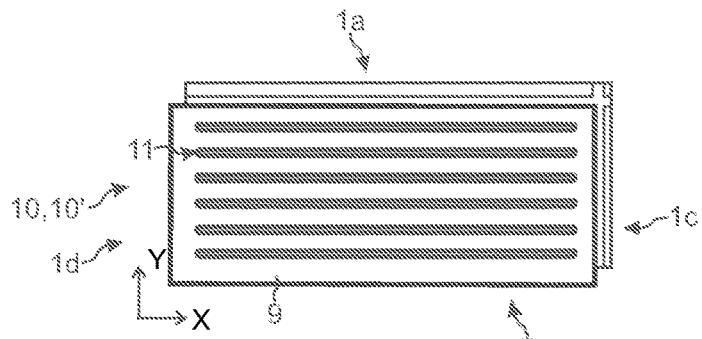
FIGS. 4a-4e illustrate in a bottom view (FIG. 4a) and in cross-sectional side views (FIGS. 4b-4e) embodiments of a board element or a panel obtainable by the method in, e.g., FIG. 3 and/or obtainable by removing material from a rear side of a preformed board element or a preformed panel.
Figure 4B:
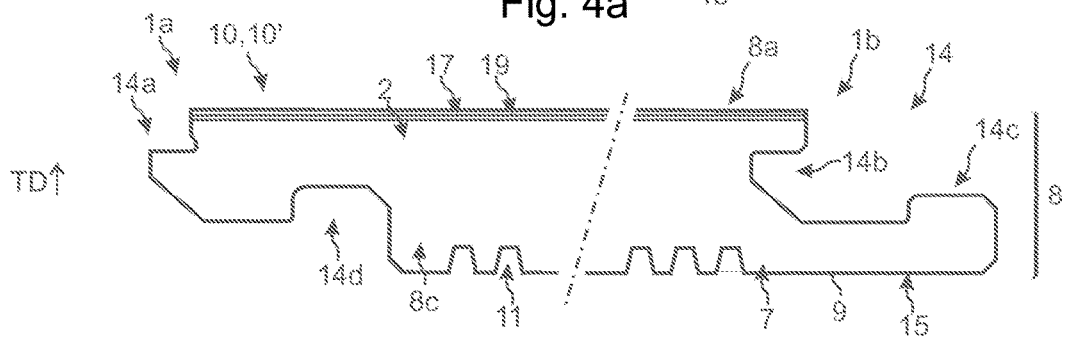
Figure 4C:
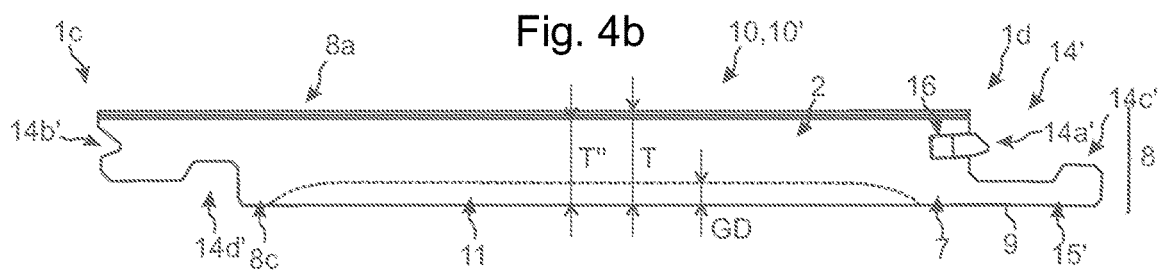
Figures 4D, 4E:
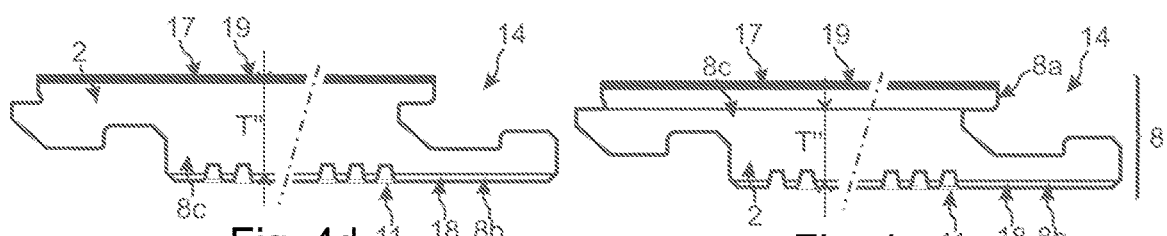
Figure 6A:
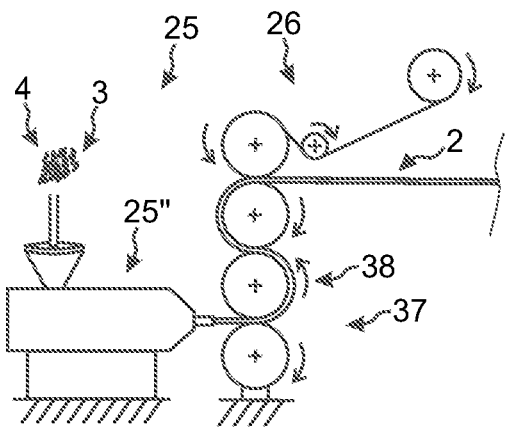
FIGS. 6a-6b illustrate in side views embodiments of an extruder configuration (FIG. 6a) and a static press configuration (FIG. 6b) that may be used in an assembly for manufacturing a board layer or a board element.
Figure 6B:
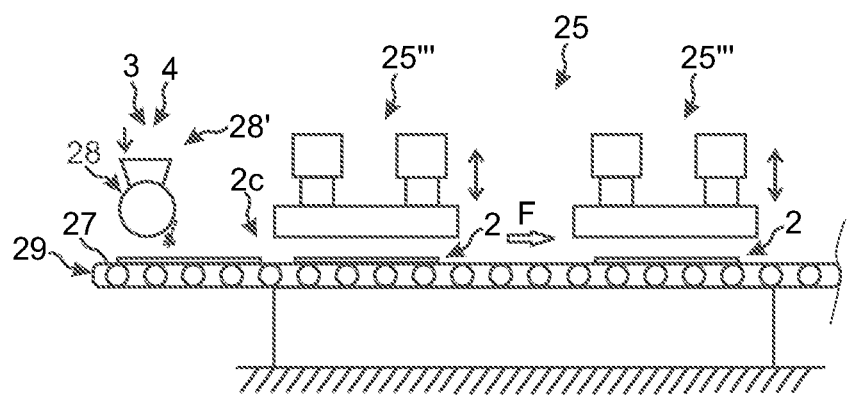

The board layer 2 may be a core 8*c* of the board element 1 to be formed and/or it may be adapted to be used as a core 8*c* of a panel 10 to be formed, cf., FIGS. 4*b*-4*d*. Optionally, and as shown in FIGS. 1*a* and 6*a*, the assembly 20 may further comprise a lamination device 26 configured to laminate an upper 8*a* and/or a lower 8*b* layer arrangement to the board layer 2. The upper layer arrangement 8*a* may include a top layer 17 comprising a wear layer and/or a décor layer, such as a print layer. The lower layer arrangement 8*b* may include a backing layer 18 that may be adapted to balance the board element 1. For example, the lamination device 26 may comprise a roller assemblage 31 comprising at least one roller 31*a*, 31*b*. The assembly 20 may further comprise a coater 32 configured to provide a coating layer 19 on the board element 1, such as a UV curable coating layer, a lacquer or a hot-melt coating layer.

The double-belt press 25' may comprise an upper 25*a* and a lower 25*b* endless belt unit configured to continuously revolve in opposite directions R1, R2, preferably by means of a driving mechanism configured to rotate drums 56 of the press 25, e.g., provided at an inlet 57*a* and/or at an outlet 57*b* thereof. A press gap 50 forming a press path P is provided between facing portions of the upper and lower belt units 25*a*, 25*b* where portions of the belts therein are displaced along the same direction, preferably along the horizontal direction X. At least a portion of the press path P may be parallel to the feeding direction F of the assembly 20, such as of the press 25. The belt units 25*a*, 25*b* may feed and guide the pre-processed 3 and the virgin 4 materials, preferably provided as a sheet-shaped layer 2*c*, along the feeding direction F and may apply heat and pressure thereto during the feeding for forming the board layer 2. The upper 30*a* and/or lower 30*b* press member(s) may be provided as a respective portion of the upper 25*a* and/or lower 25*b* belt unit(s). Preferably, the upper 30*a* and/or lower 30*b* press member(s) are/is displaceable in a direction perpendicular to the feeding direction F, such as in the vertical direction Z.

As shown in, e.g., FIGS. 1*a*-1*b*, 2*a* and 2*c*, an extension of the lower belt unit 25*b* along the feeding direction F, preferably being parallel with the horizontal direction X, may be larger than that of the upper belt unit 25*a*.

Figure 2C:
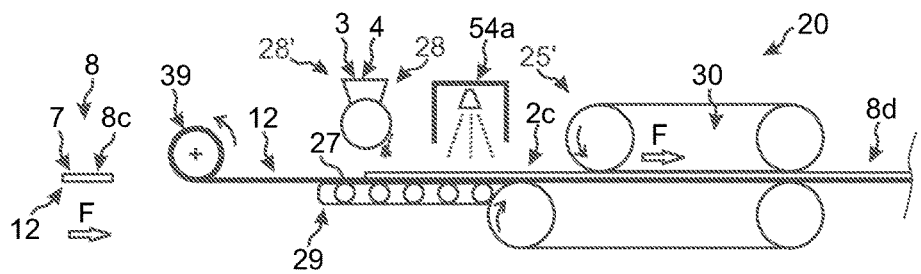
Figure 2D:
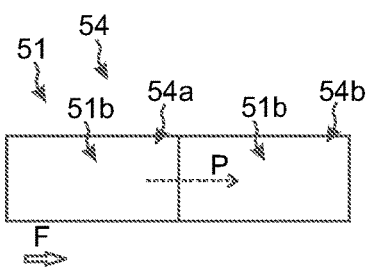
Figure 2E:
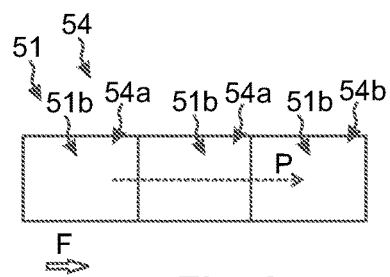
Figure 2F:
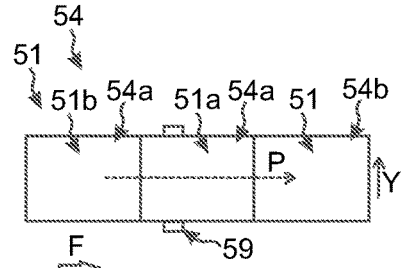

As schematically shown in FIGS. 2*d*-2*f*, the assembly 20 and/or the double-belt press 25' may comprise at least one module 51 configured to apply pressure in an isobaric process (reference number 51*a*) and/or an isochoric process (reference number 51*b*). Generally herein, precompression may be included in an isochoric module 51*b*.

An isobaric module 51*a* may comprise at least one, preferably flexible, pressure cushion configured to exert pressure on the belt(s) in the belt unit(s) 25*a*, 25*b*. For example, the pressure cushion(s) may comprise a fluid, such as oil or air, that may be configured to be pressurized for exerting the pressure. It is noted that in an isobaric module 51*a*, the press 25 may further comprise a retainer element 59 for retaining the materials 3, 4, such as along the horizontal direction Y. Thereby, a width of a sheet-shaped layer 2*c* of the materials 3, 4 and/or board layer 2 may be defined.

An isochoric module 51*b* may comprise a fixed press gap 50, e.g., formed by rollers and/or pressure bar. Alternatively, the fixed press gap 50 may be formed by means of a spacer and/or it may be formed by controlling the pressing member 30, such as controlling a, preferably vertical, position of the upper 30*a* and/or the lower 30*b* press member.

In non-limiting examples, the press 25, such as the double-belt press 25', may apply a pressure of 0.1-7.0 MPa in the pressing zone 55, preferably at a temperature of 70-260° C., such as 90-200° C.

Generally, the press 25, such as the double-belt press 25', may comprise a heating and/or cooling unit 54, 54*a*, 54*b* for providing heating and/or cooling zones along the press path P, cf., FIGS. 1*a*, 2*a* and 2*c*-2*f*. For example, the unit(s) 54 may be configured to heat and/or cool the materials 3, 4, such as the board layer 2, from above and/or from below. A heating zone may provide heat by means of, for example, oil or induction heating. It is noted that cooling includes the case where the board layer 2 is subject to a lower temperature than the pressing temperature during forming of the board layer 2 under heat and pressure. For example, cooling may include conducting heat away from the board layer 2, e.g., including the case when board layer is not actively heated. In non-limiting examples, a temperature of the cooling zone may be less than 25° C., such as less than 20° C.

The belt of the upper 25*a* and/or lower 25*b* belt units in, e.g., the embodiments in FIGS. 1*a*-1*b* and 2*a*-2*c*, may comprise a metal, preferably steel. Thereby, a high pressure on and/or a high heat transfer to the materials 3, 4 may be provided. The heating and/or cooling unit(s) 54, cf., FIGS. 2*d*-2*f*, may be provided as a portion or portions of the upper 25*a* and/or lower 25*b* belt units. For example, a heating unit 54*a* may be provided by a portion of, or being in heat communication with, the at least one drum 56 provided at the inlet 57*a*, which may be heated, e.g., by oil, see, e.g., FIG. 2*a*. In any embodiment herein, and as illustrated in FIG. 2*c*, a separate heating unit 54*a* may be utilized, for example by means of a hot oven or by infrared heating. The separate heating unit 54*a* may be located upstream of the press 25.

Sometimes, however, the temperature difference between a lowest and a highest temperature of a press portion of the press 25 configured to be heated and/or cooled may be too high, and an excessive amount of energy may be required to repeatedly heat and/or cool said press portion. For example, this may result in an overly high energy consumption and/or unreasonable high costs for its operation. Therefore, in some embodiments, and as schematically shown in FIG. 2*a*, it is preferred to utilize a separate cooling unit 54*b* situated after the press 25.

In some embodiments, the belt of the upper 25*a* and/or the lower 25*b* belt unit(s) may comprise an anti-stick material, such as polytetrafluoroethylene (PTFE), also known as Teflon®. Thereby, a tendency of the pressed material 3, 4 to stick to the belts may be counteracted. For example, the belt unit(s) 25*a*, 25*b* may comprise a mesh and a PTFE-based material, preferably filling the cavities in the mesh.

For some applications, however, the heat transfer and/or the pressure modulus in such coated belts may be insufficient. Additionally, they may occasionally not be able to withstand high pressures. In such embodiments, a combination of steel-based belts and PTFE-based belts may be utilized. For example, the steel-based belts may be provided in the pressing zone 55 and the PTFE-based belts may be provided upstream and/or downstream of the pressing zone 55 along the feeding direction F.

Optionally, and as shown in FIG. 1*b*, the double-belt press 25' may comprise nip rollers 52.

For example, the nip rollers 52 may be provided upstream and/or downstream of the pressing member 30, which optionally comprises at least one roller. The nip roller may be configured to apply a, preferably high, pressure to portions of the sheet-shaped layer 2*c* and/or the board layer 2 to be formed.

Generically herein, the double-belt press 25' may operate at a speed of 3-50 m/min, preferably along the feeding direction F and/or the press path P.

In some embodiments, the assembly 20 comprises a precompression device 58 which may form the materials 3, 4 into the sheet-shaped layer 2*c*. In a first example, and as schematically shown in, e.g., FIG. 2*a*, the precompression may be provided by a separate precompression device 58*a* provided before (upstream from) the press 25. In a second example, and as schematically shown in, e.g., FIG. 2*b*, the precompression may be provided in a precompression zone 58*b* in the double-belt press 25'. Optionally, the precompression is combined with preheating, such as at a temperature of 80-200° C., such as 100-150° C.

In some embodiments, the assembly 20 may in addition to the receptacle 22, or as an alternative thereto, comprise a waste receptacle 22' configured to receive production waste, such as internal pre-consumption waste. This is illustrated in FIG. 1*a*, but is conceivable in any embodiment herein, such as in FIGS. 1*b*, 2*a*-2*f* and 6*a*-6*b*. Other features of the waste receptacle 22' may be similar to those of the receptacle 22, whereby reference is made thereto for a detailed description.

Figure 3:
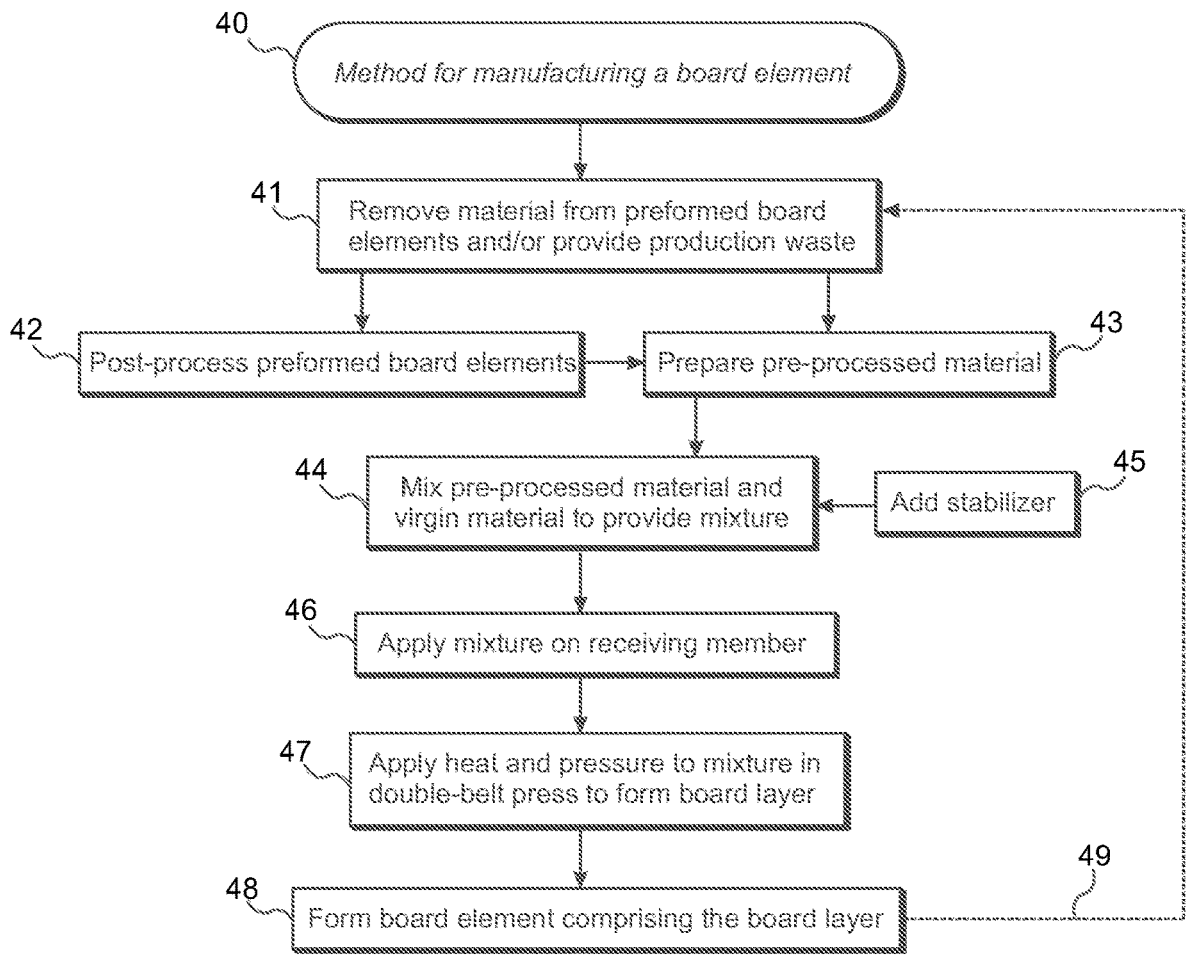
FIG. 3 illustrates a flow chart of an embodiment of a method for manufacturing a board element.

The assembly 20 in, e.g., FIGS. 1*a*-1*b*, 2*a*-2*f* and 6*a*-6*b*, is capable of implementing the method for manufacturing the board element 1 and/or the board layer 2 in accordance with the first, second or fourth aspects. The flow chart in FIG. 3 illustrates an embodiment of such a method (Box 40), which will be described next.

First, a pre-processed material 3 is provided from at least one weight-reduced preformed board element V and/or from production waste, such as internal pre-consumption waste. The pre-processed material comprises a thermoplastic material, such as PVC, PP or PE, and, preferably, a filler, such as a mineral material. The pre-processed material may be obtained by removal of material 3', such as chips, from a rear side 9 of the preformed board element V by the processing device 21 (Box 41), preferably by forming grooves 11. The preformed board element V may be post-processed (Box 42), e.g., by dividing it into at least one panel 10, such as a floor panel, in a dividing device 35 (optionally including trimming) and/or by forming a, preferably mechanical, locking device 14, 14' in a profiling unit 36. Material from the dividing process and/or the forming of a locking device may be provided as additional pre-processed material 3 for forming the board layer 2, for example by feeding it to the receptacle 22, cf., e.g., FIG. 1*b* where a waste recycling unit 60*a*, 60*b* is schematically shown.

Thereafter, the pre-processed 3 and a virgin 4 materials comprising a thermoplastic material, such as PVC, PP or PE, may be mixed in the mixer 24 for providing a mixture 5 (Box 44). The amount of virgin and pre-processed materials, e.g., in wt %, may be adapted to provide a predetermined ratio therebetween, such as 20:1-1:10 (virgin:pre-processed), such as 10:1-1:5, such as 5:1-1:1. Preferably, the mixture 5 is a homogenous blend of pre-processed and virgin materials. In a non-restrictive example, the pre-processed 3 and virgin 4 materials may comprise substantially the same material composition. Clearly, the material composition may be different in other examples. Optionally, the pre-processed material 3 may be prepared before the mixing in the preparation device 34 (Box 43), e.g., by cutting and/or separating it. A stabilizer 13 may be added to, e.g., injected into, the mixer 24 from the stabilizer reservoir 33 (Box 45). Optionally, other additives described herein may be added.

The mixture 5 is then applied on the receiving member 27, for example by scattering using the scattering device 28 (Box 46). The mixture may be formed into a, preferably sheet-shaped, layer 2*c* before pressing. The mixture 5 is then subjected to heat and pressure in the press 25, such as the double-belt press 25', to form the board layer 2 (Box 47), preferably at a pressure of 0.1-7.0 MPa and/or at a temperature of 70-260° C., such as 90-200° C. The pre-processed 3 and virgin 4 materials may thereby be combined by melting and/or fusing. Finally, a board element 1 comprising the board layer 2 may be formed (Box 48). In one example, an upper 8*a* and/or a lower 8*b* layer arrangement is laminated to the board layer 2. In another example, an upper layer arrangement 8*a* in the form of a top layer 17 comprising a wear layer and/or a décor layer is provided, such as attached, to the board layer 2. In any of these examples, however, a backing layer 18 may be included in, or may be provided as, a lower layer arrangement 8b, preferably for balancing the board element 1.

As indicated by the broken line 49 in FIG. 3, the thereby formed board element 1 may function as a new preformed board element V and the manufacturing cycle may be reiterated by performing some or all of the steps of removing, post-processing, etc., for example as specified in Boxes 41-48. Hence, at least portions of the formed board element 1 may in turn be recycled.

It is clear to the person skilled in the art that the above-described method is non-limiting and that other embodiments are equally imaginable. For example, the application of materials 3, 4 on the receiving member 27 may be implemented by scattering devices 28a, 28b, and optionally 28c, 28d, preferably providing a mixture 5, cf., FIGS. 2a-2b. The materials 3, 4 may be formed into a sheet-shaped layer 2c before pressing. Moreover, in some embodiments, the preformed board element V and/or the board element 1 is not post-processed, e.g., not divided and/or not provided with a locking device.

In any embodiment herein, more than 10 wt %, preferably more than 20 wt %, even more preferably more than 40 wt %, of pre-processed material 3 may be provided in the material provided for forming the board layer, such as in the mixture 5, and/or in the board layer 2.

Moreover, in any embodiment herein, such as in FIGS. 1a-1b, 2a-2c and 6b, the method may further comprise precompressing the pre-processed 3 and virgin 4 materials. Preferably, the precompression is isochoric.

In some embodiments, the mixture 5 may be an inhomogeneous blend of pre-processed material 3 and virgin material 4. Thereby, a board layer 2 having a varying amount of pre-processed and virgin materials may be provided, such as varying along the thickness direction TD of the board layer. For example, the mixture may be formed by means of at least two scattering devices 28a, 28b, 28c, 28d, cf., FIGS. 2b-2c.

Figure 5A:
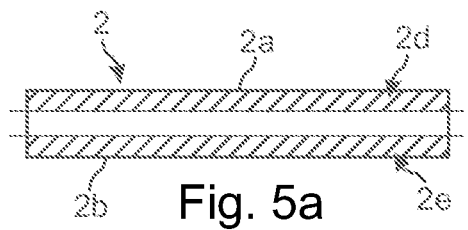
FIGS. 5a-5i illustrate in cross-sectional side views embodiments of a board layer (FIGS. 5a-5i) and of a substrate (FIGS. 5c-5i) comprising a board layer and a carrier.
Figure 5B:
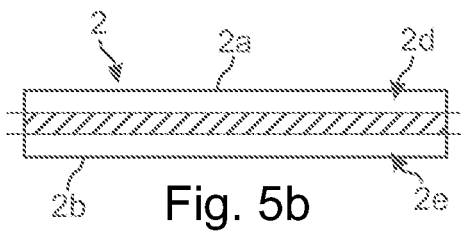

In a first example, a board layer 2 may be formed having a larger amount (e.g., in wt %) of pre-processed material 3 than virgin material 4 in an outer portion 2d and/or 2e of the board layer toward its front side 2a and/or backside 2b, see FIG. 5a. Thereby, an impact resistance and/or at least one mechanical property of the board layer 2 may be improved, such as in the outer portion 2d and/or 2e. Additionally, when the board element 1 comprises a locking device 14, 14', a locking strength thereof may be improved. In a second example, a board layer 2 may be formed having a larger amount (e.g., in wt %) of virgin material 4 than pre-processed material 3 in the outer portion 2d and/or 2e, see FIG. 5b. Thereby, a level of discoloration of the thermoplastic material may be reduced in the outer portion 2d and/or 2e. An ordinarily skilled artisan will appreciate that, within the scope of the present disclosure, the board layers in, e.g., FIGS. 5a-5b may be formed by other means than the ones described above.

In some embodiments, the application of heat and pressure comprises the following steps, in order: applying heat and pressure at a first temperature T1 and a first pressure P1; applying heat and pressure at a second temperature T2 and a second pressure P2 whose magnitude is higher than that of the first pressure; and, optionally, cooling under pressure at a third temperature T3 and a third pressure P3 whose magnitude is lower than that of the second pressure. These steps may be implemented in the module(s) 51 and heating and/or cooling unit(s) 54, cf., FIGS. 2d-2f. Preferably, however, the first, second and third pressures are applied in isochoric processes 51b. Thereby, the thickness T' and/or T'' (defined below) may become substantially constant over the entire sheet 2c and/or board layer 2, cf., FIGS. 1b and 4c-4e. The materials 3, 4 may be compressed by means of the first pressure, and may be further compressed by the second pressure, while at the same time the heat transfer to the board layer 2 to be formed may be increased. This may provide a better fusion of the materials 3, 4 and consequently a higher density of the board layer 2.

In a non-restrictive example, T1=180-220° C., T2=230-250° C., T3=50-90° C., P1=1-2 MPa, P2=4-6 MPa, and P3=0.1-0.5 and a press in the form of a double-belt press 25' may operate at a speed of, e.g., 4-10 m/min.

In some embodiments, the application of heat and pressure comprises the following steps, in order: applying heat and pressure at a first temperature T1 and a first pressure P1, and; applying heat and pressure at a second temperature T2 and a second pressure P2 whose magnitude is lower than that of the first pressure. Optionally, a pressure P3 whose magnitude is lower than that of the second pressure is then applied. These steps may be implemented in the module(s) 51 and heating and/or cooling unit(s) 54, cf., FIGS. 2d-2f. Optionally, the board layer 2 may thereafter be cooled at a temperature T3 at a third pressure P3. Preferably, the first and second pressures are applied in isochoric processes. In a non-restrictive example, T1=180-220° C., T2=230-250° C., T3=50-90° C., P1=4-6 MPa, P2=1-2 MPa, and P3=0.1-0.5 and a press in the form of a double-belt press 25' may operate at a speed of, e.g., 4-10 m/min.

In some embodiments, the method may comprise precompressing the material 3, 4 in an isochoric process, preferably at a temperature T1, such as 100-150° C., and thereafter applying heat and pressure in an isobaric process at a temperature T2, e.g., being implemented in the module(s) 51 and heating and/or cooling unit(s) 54, cf., FIG. 2f. Preferably, the board layer 2 is cooled at a temperature T3 at a third pressure P3 after the isobaric process. In accordance with these embodiments, a more uniform density may be obtained. In a non-restrictive example, T1=100-150° C., T2=230-250° C., T3=50-90° C., P1=4-6 MPa, P2=1-2 MPa, and P3=0.1-0.5 and a press in the form of a double-belt press 25' may operate at a speed of, e.g., 4-10 m/min.

It is clear to a person skilled in the art that the pre-processed 3 and/or virgin 4 material(s), and hence the board layer 2, in any embodiment herein, may comprise additives, such as at least one selected from the group of a filler, a stabilizer, a blowing agent, a plasticizer, a colourant, a foaming agent, a lubricant (e.g., internal and/or external), an impact modifier, a processing aid, etc. Additionally, any, some or all layer(s) in the upper 8a and/or lower 8b layer arrangements may comprise such additives. In non-limiting examples—in combination or separately—a degree of stabilizer may be 0.5-6 wt %, such as 1-5 wt % or 2-4 wt %, a degree of lubricant may be 0.1-1 wt %, such as 0.2-0.6 wt %, a degree of impact modifier may be 0.2-4 wt %, such as 0.5-2 wt %, and a degree of processing aid may be 0.1-3 wt %, such as 0.5-2.5 wt %.

Embodiments of a board element 1, such as a floor element, or a panel 10, such as a floor panel, obtainable by the method disclosed herein (cf., Box 40) and/or obtainable by the act of removal of material 3' from the rear side 9 (cf., Box 41) are illustrated in FIGS. 4a-4e. Any of these illustrations may correspond to embodiments of the preformed board element 1', often abbreviated as board element 1'. The rear side 9 of the panel 10 or the board element 1, 1' comprises grooves 11.

For example, the board/floor element or panel in any of FIGS. 4*a*-4*e* may be a so-called Luxury Vinyl Tile (LVT tile), a Stone Plastic (Polymer) Composite panel (SPC panel), or an Expanded Polymer Core panel (EPC panel), also known as Water Proof Core panel (WPC panel).

The panel 10 or board element 1, 1' may comprise long 1*a*, 1*b* and short 1*c*, 1*d* edge portions. As shown in FIGS. 4*a*-4*e*, a locking device 14, 14' may be formed in the panel 10 or board element 1, 1', preferably along the long 1*a*, 1*b* and/or short 1*c*, 1*d* edge portions. The locking device 14, 14' may comprise a tongue 14*a*, 14*a*' and a groove 14*b*, 14*b*' for vertical locking and/or a locking element 14*c*, 14*c*' and a locking groove 14*d*, 14*d*' for horizontal locking. The locking element 14*c*, 14*c*' may be provided on a strip 15, 15' extending beyond an upper portion of the panel 10. For example, the tongue 14*a* may be integrally formed with the panel 10 along a long edge portion 1*a*, see, e.g. FIGS. 4*b* and 4*d*-4*e*, while it may be a separately formed tongue 14*a*' provided in an insertion groove 16 provided along a short edge portion 1*d*, see, e.g. FIG. 4*c*.

Generally herein, the panel 10 or board element 1, 1' may comprise a layer arrangement 8 comprising an upper 8*a* and/or a lower 8*b* layer arrangement. The upper 8*a* and/or lower 8*b* layer arrangement may be attached, such as laminated, to the board layer 2. Any upper layer arrangement 8*a* may include a top layer 17 and as shown in FIGS. 4*d*-4*e*, any lower layer arrangement 8*b* may include a backing layer 18 and, furthermore, the panel 10 or board element 1, 1' may comprise a coating layer 19, cf., discussion above.

The board layer 2 in any of the embodiments in FIGS. 4*a*-4*e* and 5*a*-5*i* may comprise a thermoplastic material, such as PVC, PP or PE, and a filler, such as a mineral material. Moreover, the lower layer arrangement 8*b* preferably comprises a thermoplastic material, such as PVC, PP or PE, and a filler, such as a mineral material. The upper layer arrangement 8*a* may also comprise a thermoplastic material, such as PVC, PP or PE, and a filler, such as a mineral material, although other materials are equally conceivable, such as a mineral-based material, a wood-based material, or bamboo. Generally herein, the board layer 2 and/or the upper 8*a* and/or lower 8*b* layer arrangement(s) comprising a thermoplastic material may further comprise additives, such as at least one of a filler, a stabilizer, a blowing agent, a plasticizer, a colourant, a foaming agent, a lubricant, an impact modifier, a processing aid, etc.

A degree of filler may exceed 40 wt %, preferably exceeding 60 wt %, such as 75 wt % and/or a degree of plasticizer may be less than 5 wt %, preferably of the total weight, in any or both of the pre-processed 3 and the virgin 4 materials. The thermoplastic material may be 5-100 wt %, such as 10-75 wt %, such as 12-55 wt %, such as 15-35 wt %, of the total weight for one or both of the pre-processed 3 and the virgin 4 materials. Thereby, a rigid board layer 2 may be provided. For example, the rigid board layer 2 may be provided as a core 8*c*, that may be referred to as a rigid core 8*c*.

Figure 5C:
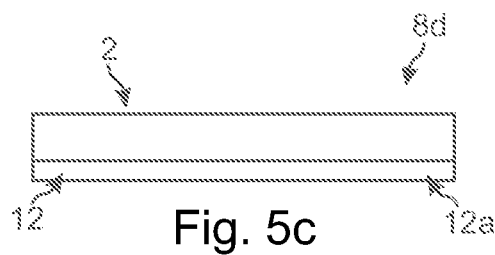
Figure 5D:
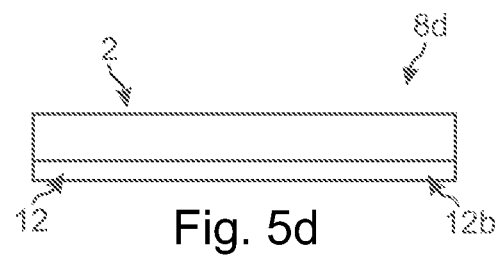
Figure 5E:
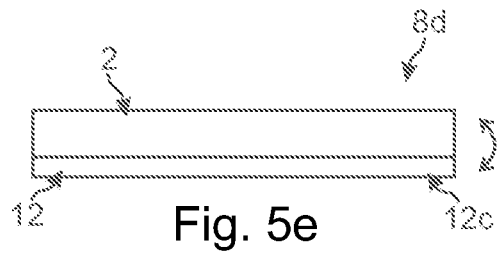
Figure 5F:
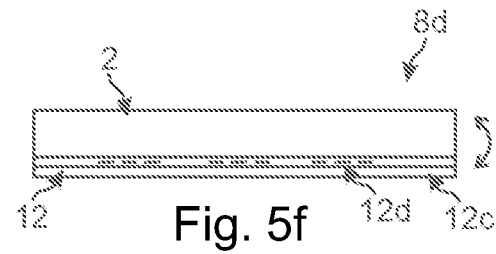
Figure 5G:
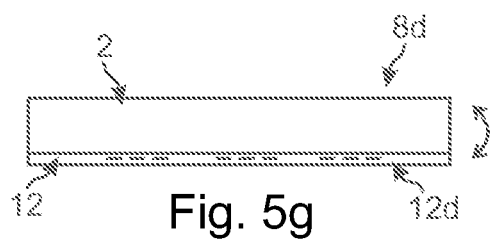
Figure 5H:
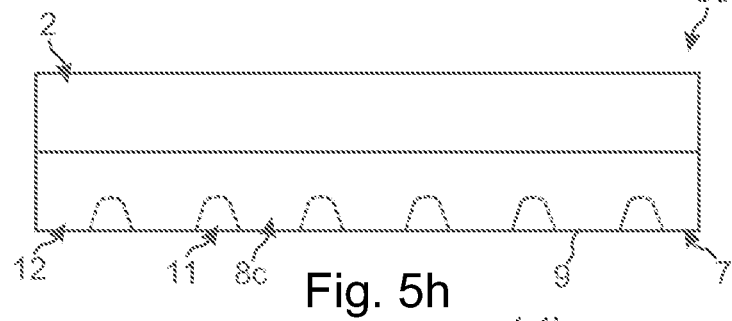

As shown in FIGS. 4*b*-4*c* and 5*h*, the grooves 11 may be provided in a single layer 7 of the layer arrangement 8. Thereby, pre-processed material 3 having a well-defined material composition may be provided from the forming of the grooves 11 (cf., Box 41). Also, the pre-processed 3 and virgin 4 materials may easily be adapted to comprise substantially the same material composition. In a non-limiting example, the single layer 7 is a, preferably rigid, core 8*c* comprising a thermoplastic material, such as PVC, and a filler.

In some embodiments, and as illustrated in, e.g., FIG. 2*c*, the method comprises applying, such as scattering, the pre-processed 3 and virgin 4 materials on a carrier 12. For example, the materials 3, 4 may be provided as a mixture 5. Hence, in these embodiments, the receiving member 27 is provided as a carrier 12, optionally being configured to be wound on a roll 39 or, as schematically shown in FIG. 2*c*, provided in the form of a layer arrangement 8, such as a single layer 7 or a, preferably rigid, core 8*c*. Other features of the assembly 20 in FIG. 2*c* may be the same as any of those described elsewhere herein, such as in relation to FIGS. 1*a*-1*b*, 2*a*-2*b* and 2*d*-2*f*.

The carrier 12 may be adapted to be part of the board element 1 to be manufactured, which preferably comprises a thermoplastic material, such as PVC, PP or PE, and a filler, such as a mineral material. The pre-processed 3 and virgin 4 materials, such as the mixture 5, may be laminated to the carrier 12 under heat and pressure in the press 25, such as a double-belt press 25'. Thereby, a substrate 8*d* comprising the carrier 12 and the board layer 2 may be formed, see, e.g., FIGS. 5*c*-5*i*. The materials 3, 4 may be formed into a sheet-shaped layer 2*c* before pressing.

In some embodiments, and as shown in FIG. 5*h*, the carrier 12 may be a core 8*c*, preferably comprising a thermoplastic material, such as PVC, PP or PE, and a filler, such as a mineral material.

Figure 5I:
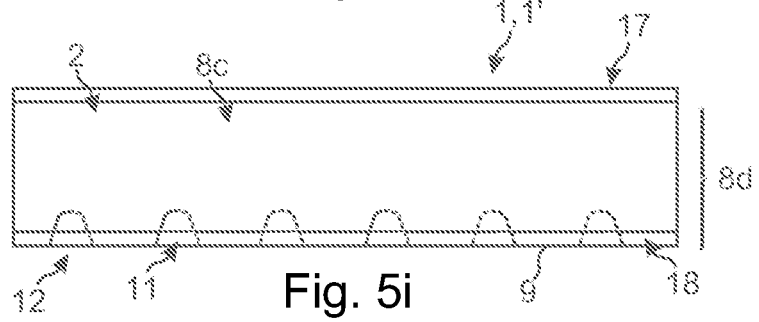

In some embodiments, and as shown in FIGS. 5*c*-5*d*, the carrier 12 may be a mat 12*a*, such as a glass-fibre mat or a fabric mat, or a paper 12*b*. In some embodiments, and as shown in FIG. 5*i*, the carrier 12 may be a backing layer 18, preferably comprising a thermoplastic material and a filler. The backing layer may have a thickness of less than 2 mm. As indicated by broken lines, it is understood that the board element 1 and/or substrate 8*d* in any of the embodiments in FIGS. 5*a*-5*i* may optionally be provided with grooves 11 and that the removed material 3' may be utilized in any of the embodiments of the method 40 disclosed herein.

In some embodiments, and as shown in FIGS. 5*e*-5*f*, the carrier 12 may be a wear layer 12*c*, optionally provided with a décor layer 12*d*, such as a print layer. The décor layer 12*d* may be provided between the wear layer 12*c* and the board layer 2. In some embodiments, as shown in FIG. 5*g*, the carrier 12 may be a décor layer 12*d*, such as a print layer, per se. The wear layer 12*c* and/or décor layer 12*d* may have a thickness of less than 0.7 mm. For example, the wear layer 12*c* may comprise a thermoplastic film. The double arrow in FIGS. 5*e*-5*g* indicates that the substrate 8*d*, when in use, preferably is oriented such that the wear layer 12*c* and/or décor layer 12*d* face(s) upwards.

Each of the mat 12*a*, the paper 12*b*, the backing layer 18, and the wear layer 12*c* and/or décor layer 12*d* preferably is flexible and may be configured to be provided on and unwound from a roll 39, FIG. 2*c*.

The board layer 2 for forming a board element 1, 1' or a panel 10, such as a floor panel, in any embodiment described herein, such as in any of FIGS. 1*a*-1*b* and 2*a*-2*b*, may be replaced by a substrate 8*d* comprising the board layer 2 and a carrier 12, whereby reference is made thereto for details. In particular, the upper 8*a* and/or the lower 8*b* layer arrangements may be embodied in the same manner. Examples of resulting board elements 1, 1' or panels 10 are illustrated in, e.g., FIGS. 4*a*-4*e* and 5*i*.

Generally herein, such as in FIGS. 1*a*-1*b*, 2*a*-2*c*, 4*a*-4*e* and 5*a*-5*i*, a thickness T', T" of the sheet-shaped layer 2*c* and/or the board layer 2 may be 0.5-6 mm and the thickness T of the board element 1, 1' and/or substrate 8*d* may be 2-10 mm. Additionally, a thickness of the core 8c may exceed 2 mm, such as exceeding 4 mm.

In some embodiments, and in accordance with the second aspect, only the pre-processed material 3 is used for forming the board layer 2 in the press 25, such as a double-belt press 25'. Thereby, a completely recycled board layer 2 may be formed. In these embodiments, the virgin material 4 and components related thereto are redundant. Other features of the assembly 20 may be the same as for the first aspect, whereby reference is made to those parts of the disclosure. In particular, an ordinarily skilled artisan will appreciate that, within the scope of the present disclosure, there is no need for the container 23 in these embodiments, such as in FIGS. 1a-1b, 2a-2c and 6a-6b. Additionally, removed material 3' from a plurality of pre-formed board elements V may be needed for forming the board layer 2.

In some embodiments herein, the press 25 may be an extruder 25'', cf., FIG. 6a, preferably being provided together with a calibrating arrangement 37 comprising rollers 38. In yet some embodiments, the press 25 may be at least one static press 25m, cf., FIG. 6b. The static press(es) 25''' may be configured to apply heat and pressure intermittently. A transportation device 29 may be configured to transport the materials 3, 4 intermittently along the feeding direction F, preferably such that a relative speed of the static press(es) and the materials 3, 4 are vanishing during pressing of the materials 3, 4 under heat. The materials 3, 4 may be provided as a sheet-shaped layer 2c before pressing, e.g., being formed by precompression in a static press 25m.

The double-belt press 25' in any embodiment herein, such as in FIGS. 1a-1b, may be replaced by the extruder 25'' or the at least one static press 25m. Other features may be similar as those described in relation to the double-belt press, whereby reference is made to the embodiments in, e.g., FIGS. 1a-1b, 2a-2f and 3. Thereby, a board layer 2 comprising thermoplastic material, and preferably a filler, formed under heat and pressure may be provided. Other features of the assembly 20 may be the same as those described in relation to the double-belt press 25', whereby reference is made to the those parts of the disclosure. The extruder or static press(es) may provide at least some of the effects and advantages described herein in relation to the double-belt press, such as an improved energy efficiency, improved fusion, etc.

EXAMPLE

The flexural properties of samples of a board layer manufactured in accordance with the first and the second aspects were tested in accordance with ISO 178. A virgin material comprising PVC (26.88 wt %), a filler (67.20 wt %), a Ca/Zn stabilizer (2.69 wt %), an external lubricant (0.20 wt %), an internal lubricant (0.20 wt %), a chlorinated polyethylene, CPE, an impact modifier (0.81 wt %) and an acrylic processing aid, ACR (2.02 wt %) in powder form was provided. The elements in the powder had a maximal size of less than 0.25 mm in three perpendicular directions. Moreover, a grinded pre-processed material comprising the same material composition as the virgin material specified above and having a maximal size of less than 2 mm in three perpendicular directions was provided. The materials were mixed into a homogeneous mixture in a hot-cold mixer and 500 g of the mixture was provided in a rectangular mold. The mixture was preheated during 10 minutes at a temperature of 185° C. (no pressure), and thereafter it was formed into a sample under heat and pressure in a static press at a temperature of 185° C. and a pressure of 5 MPa during 10 minutes. The process was repeated for forming samples S0, S1-S5 and T1-T3, each being shaped as a rectangular parallelepiped. A thickness of each of the formed samples varied between 5 and 8 mm and the dimensions of a front side of the samples were 6×12 cm.

The amount of preprocessed material of each of the samples S1-S5 is shown in Table 1. The amount of virgin and preprocessed materials adds up to 100 wt %. S0 is a reference sample comprising 100 wt % virgin material and S5 is a sample comprising 100 wt % preprocessed material.

As shown in Table 1, an improvement of some or all of the flexural properties of the reference S0 sample was found when more than 10 wt % pre-processed material was included in the mixture. Moreover, at least some of the flexural properties were significantly improved at a level of 20 wt % and especially at 40 wt %. Finally, all of the flexural properties of the sample were significantly improved for the fully recycled sample S5.

TABLE 1

Average flexural properties of at least partially recycled samples

| Sample | Flexural Modulus (N/mm²) | Flexural Strength (N/mm²) | Strain at Flexural Strength (mm/mm) | Strain at Break (mm/mm) |
| --- | --- | --- | --- | --- |
| S0 (0 wt %) | 4196 | 15.2 | 0.0049 | 0.0055 |
| S1 (5 wt %) | 4211 | 13.3 | 0.0034 | 0.0041 |
| S2 (10 wt %) | 4201 | 15.8 | 0.0050 | 0.0058 |
| S3 (20 wt %) | 4830 | 16.0 | 0.0047 | 0.0055 |
| S4 (40 wt %) | 4618 | 18.4 | 0.0077 | 0.0089 |
| S5 (100 wt %) | 7097 | 29.3 | 0.0121 | 0.0137 |

Similar tests were conducted on samples T1, T2 and T3, each comprising 20 wt % pre-processed material, but having particle sizes of less than 0.3 mm, 0.3-0.6 mm, and larger than 0.6 mm, respectively. More specifically, a pre-processed material having a maximal size of less than 2 mm was separated into these three groups by sieving it through square meshes with hole sizes of 0.3×0.3 mm and 0.6×0.6 mm. As shown in Table 2 it was found that a larger particle size resulted in at least some improved flexural properties of the sample. It is finally remarked that a smaller particle size (T1) resulted in unchanged or worsened flexural properties.

TABLE 2

Average flexural properties of partially recycled samples comprising different particle sizes

| Sample | Flexural Modulus (N/mm²) | Flexural Strength (N/mm²) | Strain at Flexural Strength (mm/mm) | Strain at Break (mm/mm) |
| --- | --- | --- | --- | --- |
| T1 | 3834 | 13.6 | 0.0049 | 0.0054 |
| T2 | 4514 | 16.1 | 0.0051 | 0.0060 |
| T3 | 4783 | 16.2 | 0.0044 | 0.0055 |

Based on the current understanding by the inventors of the various aspects disclosed herein, results similar to those above are expected to be applicable also in a double-belt press as well as in an extruder.

Aspects of the disclosure has mainly been described above with reference to a few embodiments. However, as is readily appreciated by a person skilled in the art, other embodiments than the ones disclosed above are equally possible within the scope of the disclosure. In some embodiments, the method in accordance with the first or second aspects comprises manufacturing an at least partially recycled board layer suitable for use in a board element, such as a floor element. Thereby, the method disclosed herein includes the forming of the board layer 2 per se, but not necessarily the forming of the board element 1. For example, the board layer may be temporarily stored and may be used at a later time for the forming of a board element, within the same or a different manufacturing plant. Finally, it is understood that a part of the embodiments in FIGS. 1*a*-1*b* and 2*a*-2*c* and 6*a*-6*b* are simplified and that the assembly 20 disclosed therein may comprise other components, such as at least one selected from the group consisting of a processing device 21, a receptacle 22, a container 23, a mixer 24, a lamination device 26, a coater 32, a stabilizer reservoir 33, preparation device 34, a dividing device 35, a profiling unit 36, at least one module 51, a heating and/or cooling unit 54, a precompression device 58, and a waste recycling unit 60*a*, 60*b*.

EMBODIMENTS

Item 1. Method for manufacturing a board element (1), such as a floor element, comprising an at least partially recycled board layer (2), the method comprising:
- providing a pre-processed material (3) from at least one, optionally weight-reduced, preformed board element (1'), preferably being obtained by removal of material (3') from a rear side (9) thereof, wherein the pre-processed material comprises a thermoplastic material and, preferably, a filler,
- providing a virgin material (4) comprising a thermoplastic material and, preferably, a filler;
- applying heat and pressure to the pre-processed material (3) and the virgin material (4) in a press (25) to form said board layer (2); and
- forming a board element (1) comprising the board layer (2).

Item 2. The method according to item 1, wherein the press (25) is operating at a pressure of 0.1-7.0 MPa and/or at a temperature of 70-260° C., such as 90-200° C.

Item 3. The method according to item 1 or 2, wherein the press (25) applies pressure to the pre-processed (3) and virgin (4) materials in an isobaric and/or an isochoric process.

Item 4. The method according to any of the preceding items, further comprising precompressing the pre-processed (3) and virgin (4) materials.

Item 5. The method according to any of the preceding items, wherein the pre-processed material (3) and the virgin material (4) comprise substantially the same material composition.

Item 6. The method according to any of the preceding items, wherein the pre-processed material (3) is provided by removal of material (3') from a rear side (9) and from a single layer (7) of the preformed board element(s) (V).

Item 7. The method according to any of the preceding items, further comprising forming grooves (11) by removing material (3') from the rear side (9) of said preformed board element(s) (V) to provide said pre-processed material (3).

Item 8. The method according to item 7, wherein the material (3') is removed by a processing device (21), such as a rotating cutting device (21*a*).

Item 9. The method according to any of the preceding items, wherein more than 10 wt %, preferably more than 20 wt %, even more preferably more than 40 wt %, of pre-processed material (3) is provided.

Item 10. The method according to any of the preceding items, wherein the pre-processed material (3) and/or the virgin material (4) comprise(s) PVC.

Item 11. The method according to any of the preceding items, wherein a degree of filler exceeds 40 wt % and/or a degree of plasticizer is less than 5 wt % in any or both of the pre-processed (3) and the virgin (4) materials.

Item 12. The method according to any of the preceding items, further comprising mixing the pre-processed material (3) and the virgin material (4) to provide a mixture (5) and applying heat and pressure to the mixture (5) in said press (25).

Item 13. The method according to item 12, further comprising scattering said mixture (5) on a receiving member (27).

Item 14. The method according to item 12 or 13, wherein said mixing further comprises mixing a stabilizer (13) with the pre-processed (3) and virgin (4) materials.

Item 15. The method according to any of the preceding items 12-14, further comprising preparing the pre-processed material (3) before said mixing, such as by cutting and/or separation.

Item 16. The method according to any of the preceding items 12-15, wherein said mixing comprises hot-cold mixing the pre-processed (3) and virgin (4) materials.

Item 17. The method according to any of the preceding items, further comprising applying the pre-processed (3) and virgin (4) materials on a carrier (12).

Item 18. The method according to any of the preceding items, wherein said forming a board element (1) includes laminating an upper (8*a*) and/or a lower (8*b*) layer arrangement to the board layer (2), preferably under heat and/or pressure.

Item 19. The method according to any of the preceding items, wherein said press (25) is or comprises an extruder (25") or at least one static press (25').

Item 20. Method for manufacturing a board element (1), such as a floor element, comprising a completely recycled board layer (2), the method comprising:
- providing a pre-processed material (3) from at least one, optionally weight-reduced, preformed board element (V), preferably being obtained by removal of material (3') from a rear side (9) thereof, wherein the pre-processed material comprises a thermoplastic material and, preferably, a filler,
- applying heat and pressure to the pre-processed material (3) in a press (25), such as a double-belt press (25'), to form said board layer (2); and
- optionally, forming a board element (1) comprising the board layer (2).

Item 21. The method according item 20 and further according to any of the preceding items 2-3, 6-8, 10 and 18-19.

Item 22. The method according item 20 or 21, further comprising precompressing the pre-processed material (3).

Item 23. The method according to any of the preceding items 20-22, further comprising applying, such as scattering, said pre-processed material (3) on a receiving member (27).

Item 24. The method according to any of the preceding items 20-23, further comprising mixing a stabilizer (13) with the pre-processed material (3).

Item 25. The method according to any of the preceding items 20-23, further comprising preparing the pre-processed material (3) before said applying heat and pressure, such as by cutting and/or separation.

Item 26. The method according to any of the preceding items 20-25, further comprising applying the pre-processed material (3) on a carrier (12).

Item 27. Assembly (20) for manufacturing of a board element (1), such as a floor element, comprising an at least partially recycled board layer (2), the assembly comprising:
- a processing device (21) configured to remove material (3') from a preformed board element (V), preferably from a rear side (9) thereof;
- a receptacle (22) configured to receive material removed by the processing device and/or a waste receptacle (22') configured to production waste;
- a container (23) for containing a virgin material (4);
- optionally a mixer (24) communicating with the receptacle and/or the waste receptacle and the container and/or an application device (28'), such as a scattering device (28), configured to apply, such as scatter, the removed material (3') and the virgin material on a receiving member (27) of the assembly (20);
- a press (25), such as a double-belt press (25'), configured to apply heat and pressure to form said board layer (2); and
- optionally a lamination device (26) configured to laminate an upper (8a) and/or a lower (8b) layer arrangement to the board layer.

Item 28. Method for manufacturing a board element (1), such as a floor element, comprising an at least partially recycled board layer (2), the method comprising:
- providing a pre-processed material (3) from production waste, wherein the pre-processed material comprises a thermoplastic material and, preferably, a filler, providing a virgin material (4) comprising a thermoplastic material and, preferably, a filler;
- applying heat and pressure to the pre-processed material (3) and the virgin material (4) in a press (25), such as a double-belt press (25'), to form said board layer (2); and
- forming a board element (1) comprising the board layer (2).

Item 29. The method according to item 28, wherein the production waste is internal pre-consumption waste provided from a forming of a preformed board element (V), such as from a dividing process and/or from a formation of a locking device (14; 14') and/or from removal of material from a rear side (9) thereof, etc.

Item 30. Board element (1), such as a floor element, obtainable by the method according to any of the preceding items 1-26 or 28-29.

Item 31. Board layer (2), wherein an amount of pre-processed material (3) is larger than an amount of virgin material (4) in an outer portion (2d; 2e) of the board layer.

Item 32. Board layer (2), wherein an amount of virgin material (2) is larger than an amount of pre-processed material (3) in an outer portion (2d; 2e) of the board layer.

The invention claimed is:

1. A method for manufacturing a floorboard element comprising an at least partially recycled board layer, the method comprising:
   providing a pre-processed material from at least one weight-reduced preformed board element, wherein the pre-processed material comprises a thermoplastic material;
   providing a virgin material comprising a thermoplastic material;
   applying the pre-processed and virgin materials on a carrier by scattering;
   applying heat and pressure to the pre-processed material and the virgin material on the carrier in a double-belt press to form said board layer; and
   forming a floorboard element comprising the board layer, the method further comprising mixing the pre-processed material and the virgin material to provide a mixture and applying the heat and pressure to the mixture in said double-belt press,
   wherein, during the providing of the pre-processed material, the pre-processed material is more than 20 wt % of a total amount of material that is provided,
   wherein a degree of inorganic filler exceeds 60 wt % of a total weight in any or both of the pre-processed and the virgin materials,
   wherein the pre-processed material and the virgin material comprise PVC, and
   wherein the thermoplastic material is 12-55 wt % of a total weight for one or both of the pre-processed and the virgin materials.

2. The method according to claim 1, wherein the double-belt press is operating at a pressure of 0.1-7.0 MPa and/or at a temperature of 70-260° C.

3. The method according to claim 1, wherein the double-belt press applies pressure to the pre-processed and virgin materials in an isobaric and/or an isochoric process.

4. The method according to claim 1, further comprising precompressing the pre-processed and virgin materials.

5. The method according to 1, wherein the pre-processed material and the virgin material comprise substantially the same material composition.

6. The method according to claim 1, wherein the pre-processed material is provided by removal of material from a rear side and from a single layer of the at least one preformed board element.

7. The method according to claim 1, further comprising forming grooves by removing material from a rear side of said at least one preformed board element to provide said pre-processed material.

8. The method according to claim 7, wherein the material is removed by a processing device.

9. The method according to claim 1, a degree of plasticizer is less than 5 wt % in any or both of the pre-processed and the virgin materials.

10. The method according to claim 1, further comprising scattering said mixture on the carrier.

11. The method according to claim 1, wherein said mixing further comprises mixing a stabilizer with the pre-processed and virgin materials.

12. The method according to claim 1, further comprising preparing the pre-processed material before said mixing.

13. The method according to claim 1, wherein said mixing comprises hot-cold mixing the pre-processed and virgin materials.

14. The method according to claim 1, wherein said forming a floorboard element includes laminating an upper and/or a lower layer arrangement to the board layer.

15. The method according to claim 8, wherein the processing device is a rotating cutting device.

16. The method according to claim 12, wherein the preparing of the pre-processed material before said mixing is performed by cutting and/or separation.

17. The method according to claim 1, wherein the board layer has a Young's modulus of 1 to 10 GPa.

18. The method according to claim 1, wherein the board layer has a Young's modulus of 3 to 7 GPa.

19. The method according to claim 1, wherein the carrier is a glass fiber mat.

* * * * *

UNITED STATES PATENT AND TRADEMARK OFFICE
CERTIFICATE OF CORRECTION

| | | |
|---|---|---|
| PATENT NO. | : 12,350,865 B2 | Page 1 of 1 |
| APPLICATION NO. | : 17/705465 | |
| DATED | : July 8, 2025 | |
| INVENTOR(S) | : Per Josefsson et al. | |

It is certified that error appears in the above-identified patent and that said Letters Patent is hereby corrected as shown below:

In the Claims

Column 22, Line 25, Claim 5:
"according to 1,"

Should read:
-- according to claim 1, --

Column 22, Line 38, Claim 9:
"a degree"

Should read:
-- wherein a degree --

Signed and Sealed this
Twenty-first Day of October, 2025

John A. Squires
*Director of the United States Patent and Trademark Office*